United States Patent [19]
Kaiser

[11] Patent Number: 5,601,323
[45] Date of Patent: Feb. 11, 1997

[54] COOKING TONG APPARATUS

[76] Inventor: Armond A. Kaiser, 7521 NW. 25th Ter., Bethany, Okla. 73008

[21] Appl. No.: 461,138

[22] Filed: Jun. 5, 1995

[51] Int. Cl.$^6$ .................................................. A47J 43/28
[52] U.S. Cl. .............................................. 294/7; 294/118
[58] Field of Search ................................. 294/3, 7, 8, 8.5, 294/9–11, 50.8, 51, 52, 55.5, 118, 119

[56] References Cited

U.S. PATENT DOCUMENTS

| | | | |
|---|---|---|---|
| D. 250,080 | 10/1978 | Kavalaris | D7/105 |
| 749,110 | 1/1904 | Spangler | 294/118 |
| 1,095,054 | 4/1914 | Wiesenfeld | 294/118 |
| 1,484,100 | 2/1924 | Wertz | 294/119 |
| 2,892,655 | 6/1959 | Bower | 294/7 |
| 3,213,779 | 10/1965 | First | 294/7 |
| 3,361,468 | 1/1968 | Case | 294/8 |
| 3,964,775 | 6/1976 | Boyd | 294/16 |
| 4,002,365 | 1/1977 | Rader | 294/8 |
| 4,073,533 | 2/1978 | De brey et al. | 294/118 |
| 4,478,449 | 10/1984 | Bernier | 294/10 |

*Primary Examiner*—Dean Kramer
*Attorney, Agent, or Firm*—Bill D. McCarthy; Phillip L. Free, Jr.; Randall K. McCarthy

[57] ABSTRACT

Cooking tong apparatus for handling food items on a grill, the cooking tong apparatus having first and second jaws disposed in opposing gripping engagement, wherein the jaws open and close in a vertical direction and each jaw has a plurality of tines that are properly spaced apart and sized to fit between standard cross-members of a grill. The cooking tong apparatus has first and second handles which lie in a substantially horizontal plane, allowing a user to operate the cooking tong apparatus in a manner which is most comfortable for the user's hand and wrist.

10 Claims, 3 Drawing Sheets

COOKING TONG APPARATUS

BACKGROUND OF THE INVENTION

1. Field of the Invention

The present invention relates generally to grasping elements and more particularly, but not by way of limitation, to improved food handling tongs useful as cooking utensils.

2. Brief Statement of the Prior Art

The backyard barbecue ranks with baseball and apple pie as famous American traditions. Barbecuing or "grilling" accommodates a wide range of food items, such as: burgers, hot dogs, chicken, kabobs, ribs, and just about any other meat item. Grilled food has a distinct flavor that is very desirable and boasts numerous health benefits as well.

Because of these flavor and health advantages, grilled food has become increasingly popular. In fact, many homes now have stove-top grill systems built-in to accommodate in-door grilling. The popularity of grilled food among consumers has also prompted commercial eating establishments to offer increasing numbers of grilled items.

Despite the enormous popularity of grilled food, cooking utensils currently used for grilling suffer from several drawbacks. Perhaps the most common cooking utensil used for grilling is the conventional spatula. To turn an item of food on the grill using a spatula, the spatula must be slid between the grill surface and the food item. Often times this involves pushing the food item around on the grill surface until the spatula finally slides under the food item, then flipping the food item back onto the grill so that the opposite side is exposed to the grill surface. Used in this manner, the spatula frequently does not cleanly pick up food from the grill.

The conventional spatula also does not allow one to conveniently check the doneness without turning a food item over to view the bottom side of the food item, and multiple turning is required to view the cooked sides of the food item. To check doneness using a standard spatula, one must flip a food item over so that the bottom side of the food item can be viewed, then flip the food item back so that it can continue to cook on that side. When cooking delicate food items this process can deteriorate the integrity and appearance of the food.

Another commonly used utensil for grilling is the conventional set of kitchen tongs. Such conventional tongs are not well suited, however, for many food items, e.g., burgers. Use of such tongs often causes the same problems in picking up food items as caused by a spatula. Further, such tongs operate in an up and down direction (i.e., in a vertical plane), requiring the operator to manipulate the operating hand in an uncomfortable wrist position.

In addition, there is currently no single utensil that is well suited for all of the various items of food which may be cooking on a grill at the same time. For instance, a spatula is generally adequate for burgers, but a set of conventional tongs is required for chicken.

Thus, while prior art cooking utensils exist, there remains a need for a single utensil that is useful for the various items of food which are often cooked on a grill and which does not suffer from the drawbacks of currently available devices.

SUMMARY OF THE INVENTION

The present invention provides a cooking tong apparatus for handling food items on a grill. The cooking tong apparatus of the present invention, in one embodiment thereof, comprises a first tong element having a first jaw attached to a first end thereof, the first jaw having a plurality of spaced apart tines substantially parallel to each other. A first handle is attached to a second end of the first tong element.

A second tong element is pivotally attached to the first tong element by a first pivotal attachment means at a first pivot point, the second tong element also having a first end to which a second jaw is attached, the second tong element having a bar engaging bore therethrough. The second jaw attached to the first end of the second tong element has a plurality of substantially parallel and spaced apart tines. The first and second jaws are disposed in opposing gripping engagement to each other so that the first and second jaws open and close as the first and second tong elements are pivoted about the first pivot point.

A third tong element is pivotally attached to the first tong element by a second pivotal attachment means at a second pivot point disposed between the first handle and the first pivot point, the third tong element having an actuating bar attached to the first end thereof and a second handle attached to a second end thereof. The second handle is disposed opposite the first handle, wherein the actuating bar slidably engages the bar engaging bore in the second tong element as the first and second handles are pivoted about the second pivot point, causing the first and second jaws to open and close.

An object of the present invention is to provide an improved cooking tong apparatus which allows rapid and clean removal of food items from the surface of a grill to be turned over for further cooking or to be transferred to a platter when cooking is complete.

Another object of the present invention, while achieving the above stated object, is to provide a cooking tong apparatus which allows the user to view either side of the food item removed from the grill thereby.

A further object of the present invention, while achieving the above stated objects, is to provide a cooking tong apparatus which allows the user to hold the apparatus in a more comfortable position and which operates to accommodate the manner in which the human hand and wrist operate most comfortably.

Still another object of the present invention, while achieving the above stated objects, is to provide a cooking tong apparatus which can be used with any food item on a grill.

Other objects, advantages and features of the present invention will become apparent from a reading of the following description when taken in conjunction with the accompanying drawings and appended claims.

BRIEF DESCRIPTION OF THE DRAWINGS

A preferred embodiment of this invention has been chosen for purposes of illustration and description wherein:

FIG. 6 is an enlarged partial side elevational view of the cooking tong apparatus of FIG. 1, showing the actuating bar and the bar engaging bore.

FIG. 7 is an exploded top plan view of the second jaw of the cooking tong apparatus of FIG. 1.

DESCRIPTION

Figure 1:
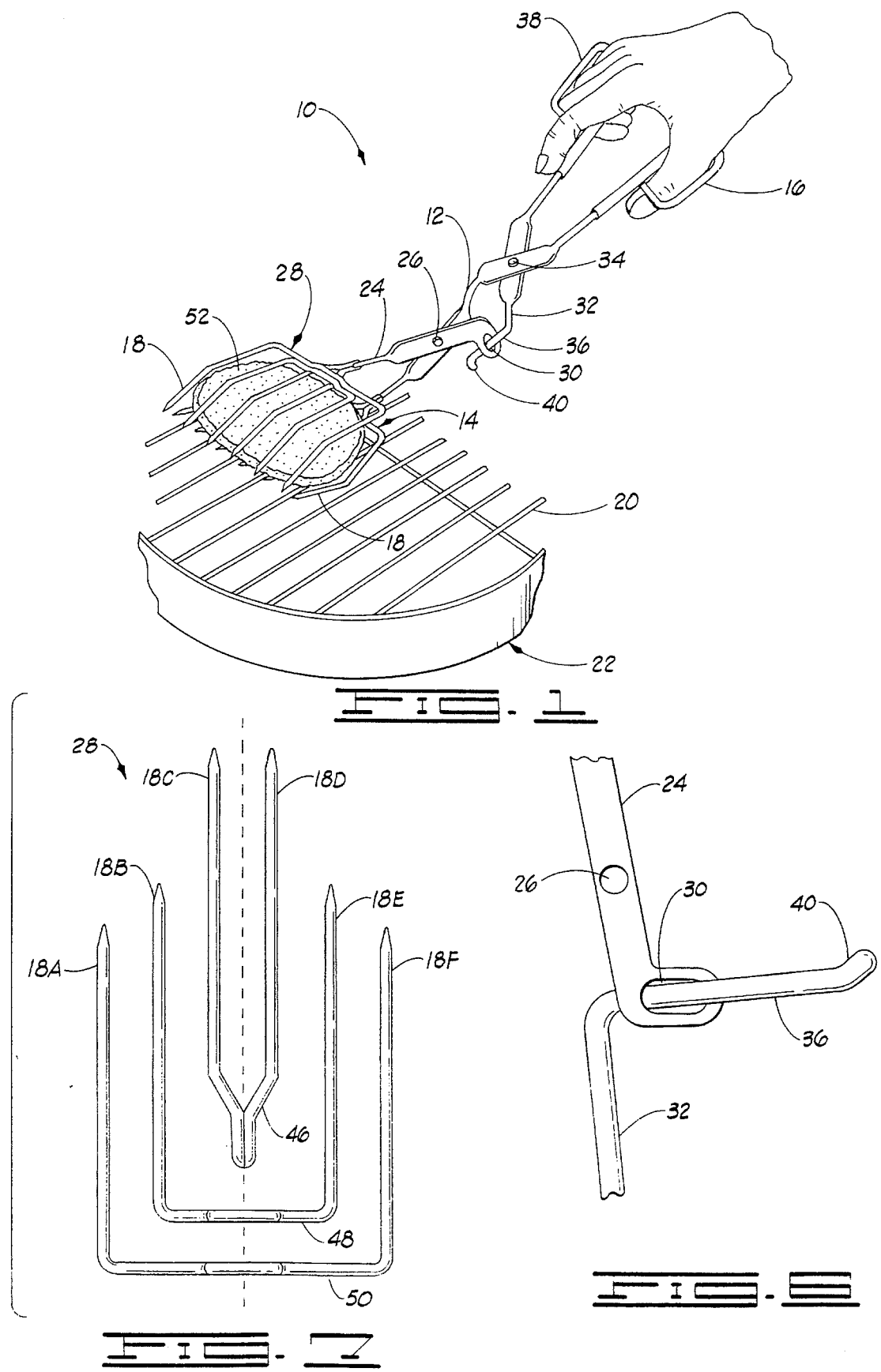
FIG. 1 is a perspective view of a cooking tong apparatus constructed in accordance with the present invention and being utilized for handling a food item upon a grill.

The present invention is particularly useful in connection with a cooking device of spaced apart, parallel cross-members on which food is exposed to heat, commonly referred to as a grill. In accordance with the accompanying drawings, the cooking tong apparatus of the present invention is generally designated 10 and includes a first tong element 12 having a first jaw 14 attached to a first end thereof and a first handle 16 attached to a second end thereof. The first jaw 14 has a plurality of tines 18 that are spaced apart and preferably are inwardly curved and substantially parallel, the tines forming a first food gripping surface. As shown in FIG. 1, the tines 18 are properly spaced and sized to fit between cross-members 20 of a grill 22.

Figures 2, 3:
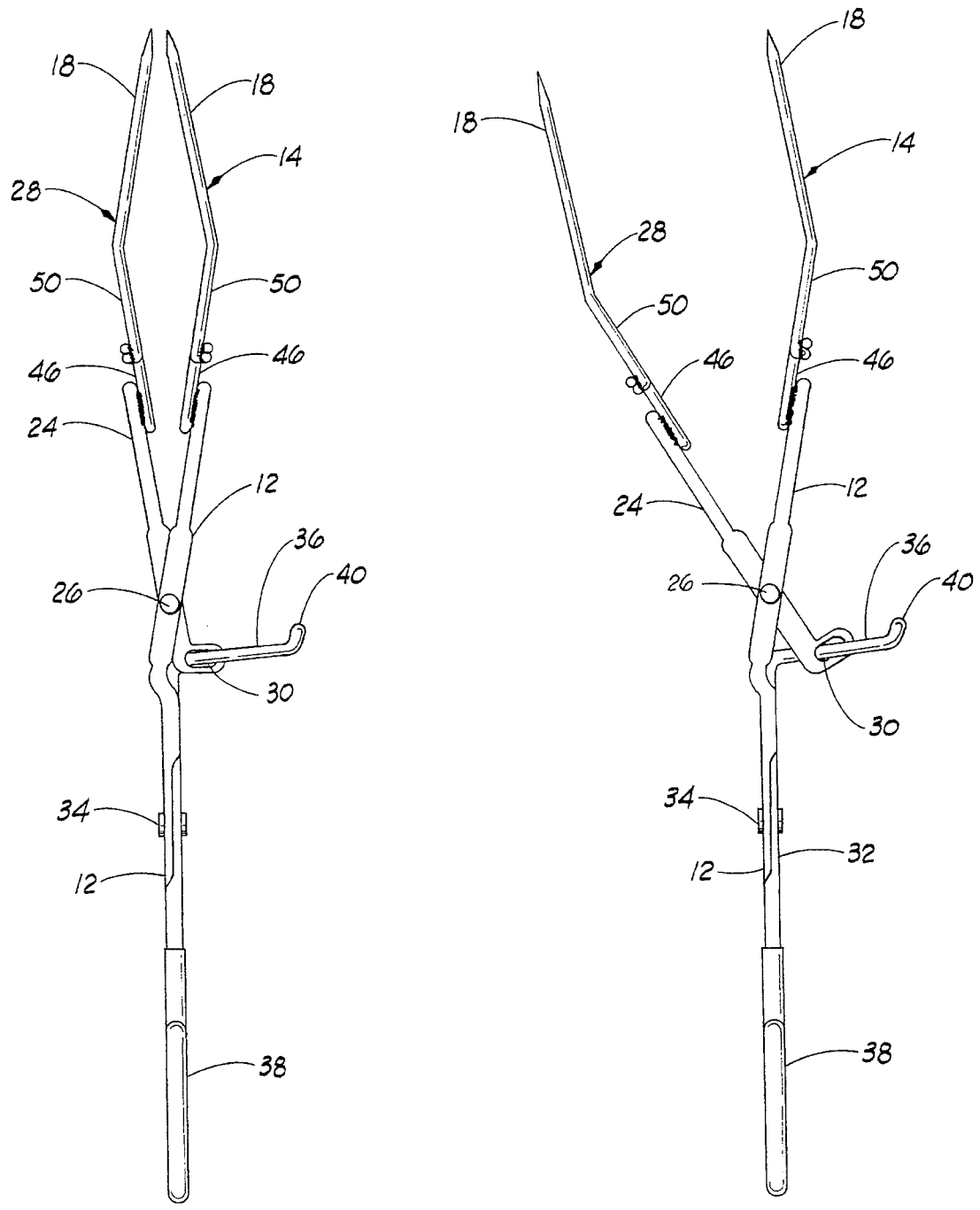
FIG. 2 is a side elevational view of the cooking tong apparatus of FIG. 1 shown in the closed, food gripping position.
FIG. 3 is a side elevational view of the cooking tong apparatus of FIG. 1 shown in the open position.

Turning to FIGS. 2 and 3, a second tong element 24 is pivotally attached to the first tong element 12 by a first pivotal attachment member 26 at a first pivot point, allowing the first and second tong elements 12, 24 to move substantially vertically (i.e., substantially in a vertical plane perpendicular to the grilling surface of the cross-members 20). The first pivotal attachment member 26 can be any suitable means for pivotally attaching the first and second tong elements 12, 24. Suitable results have been obtained using a rivet for the first pivotal attachment member 26; however, numerous means for performing the same function, (e.g., a nut and bolt) are encompassed within the spirit and scope of the present invention.

The second tong element 24 has a second jaw 28 attached to a first end thereof (the distal end), and a bar engaging bore 30 through a second end thereof (the proximal end). As with the first jaw 14, the second jaw 28 has a plurality of tines 18 that are spaced apart, inwardly curved, and substantially parallel, the tines 18 forming a second food gripping surface. The first jaw 14 and the second jaw 28 are disposed in opposing, gripping engagement to each other so that the first and second jaws 14, 28 open and close in a substantially vertical direction as the first and second tong elements 12, 24 are pivoted about the first pivotal attachment member 26.

Figure 4:
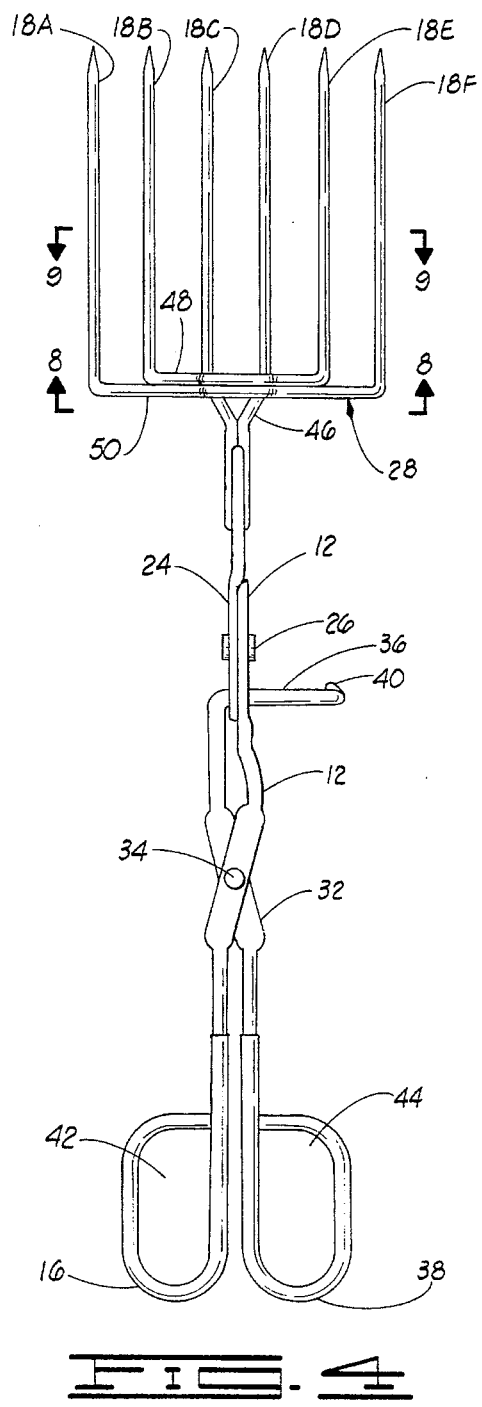
FIG. 4 is a top plan view of the cooking tong apparatus of FIG. 1 shown in the closed, food gripping position.
Figure 5:
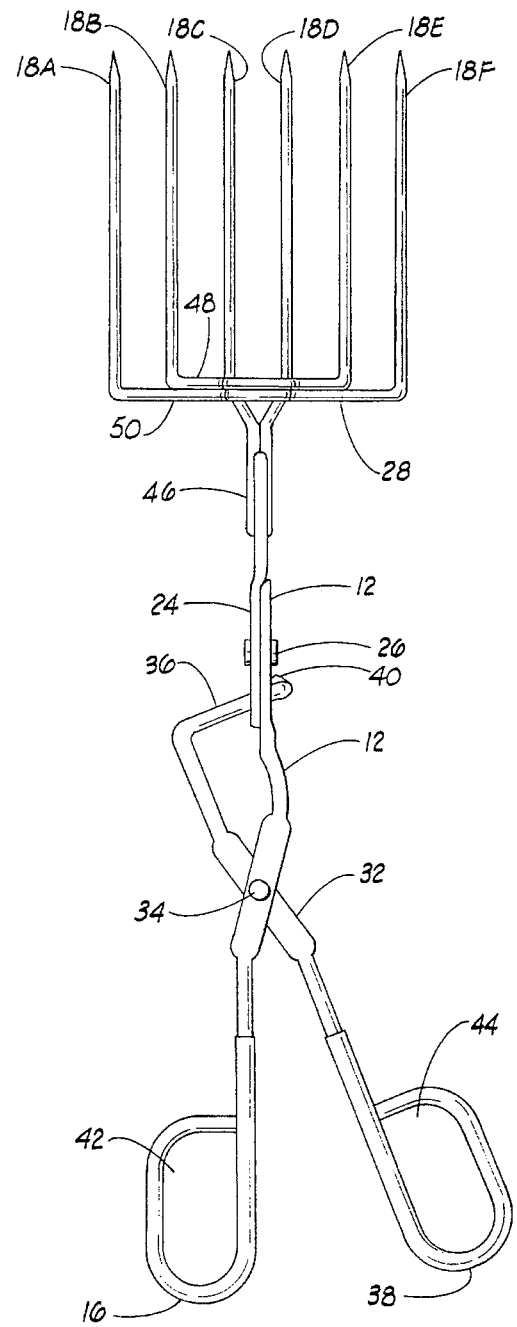
FIG. 5 is a top plan view of the cooking tong apparatus of FIG. 1 shown in the open position.

Turning now to FIGS. 4 and 5, a third tong element 32 is pivotally attached to the first tong element 12 by a second pivotal attachment member 34 at a second pivot point, allowing the second and third tong elements 12, 32 to operate in a substantially horizontal plane (i.e., parallel to the grilling surface). The second pivotal attachment member 34 can be any suitable means for pivotally attaching the second and third tong elements 12, 32. Suitable results have been obtained using a rivet for the second pivotal attachment member 34. As noted above, numerous means for performing the same function (e.g., a nut and bolt) are encompassed within the spirit and scope of the present invention.

As shown in FIG. 6, the third tong element 32 has an actuating bar 36 attached to a first end thereof and a second handle 38 attached to a second end thereof. The actuating bar 36 is disposed such that it extends through and slidably engages the bar engaging bore 30. The actuating bar 36 has a flanged portion 40 designed to prevent the actuating bar 36 from being withdrawn from the bar engaging bore 30 in the operation of the cooking tong apparatus 10.

Returning to FIGS. 4 and 5, the first and second handles 16, 38 each preferably have a finger receiving aperture 42, 44 (sometimes referred to herein as a "finger gripping loop") disposed in a horizontal plane, to aid the user in holding and operating the first and second handles 16, 38. Although the drawings depict the first and second handles 16, 38 as defining substantially oval finger receiving apertures 42, 44, it will be obvious to persons of skill in the art that the particular design of the first and second handles 16, 38 or shape of the finger receiving apertures 42, 44 can be modified into numerous configurations. Desirably, the first and second handles 16, 38 are dip coated with a suitable plastic or elastomeric coating to provide thermal insulation and greater user comfort.

Preferably, the first and second jaws 14, 28 each have six tines 18A through 18F. The first and second jaws 14, 28 each include three component parts: a central tine component 46; an intermediate tine component 48; and an outer tine component 50. As best depicted in FIGS. 2 and 3, the first and second jaws 14, 28 are attached to the first and second tong elements 12, 24 at the central tine component 46.

Figure 8:
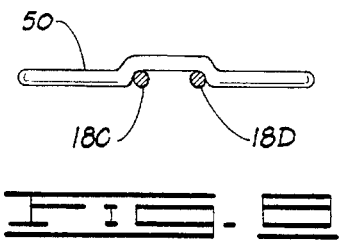
FIG. 8 is a view of the cooking tong apparatus taken along line 8—8 of FIG. 4, showing a sectional view of the second jaw.
Figure 9:
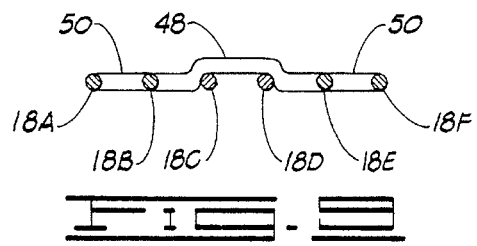
FIG. 9 is a view of the cooking tong apparatus taken along line 9—9 of FIG. 4, showing a sectional view of the second jaw.

As shown in FIG. 7, the central tine component 46 is substantially Y-shaped, forming the center two tines 18C, 18D. The outer tine component 50 is substantially C-shaped, and forms the two outermost tines 18A, 18F. Likewise, the intermediate tine component 48 is also substantially C-shaped and forms the remaining two tines 18B, 18E. FIGS. 8 and 9 show that the intermediate tine component 48 and the outer tine component 50 are radiused at the points that intersect the central tine component 46, so that all of the tines will occupy a proper spatial relationship.

Alternative embodiments of the present invention include various means for closing the first and second jaws 14, 28, or handle means. Although a preferred embodiment of the handle means has been described hereinabove, persons skilled in the art will recognize numerous other such handle means, all of which are encompassed within the spirit and scope of the present invention. For example, one embodiment might utilize the handle means of conventional cooking tongs in combination with the first and second jaws 14, 28 of the present invention. Such handle means includes first and second handles (not shown) and a means for pivotally connecting such handles. Another embodiment might utilize a handle means which operates in a manner similar to that of tweezers. Such handle means would include first and second handles (not shown) disposed in a substantially parallel relationship and held apart by a biasing means, connected to the first and second handles, for biasing the first and second jaws 14, 28 into the open position. Squeezing on the handles by the operator overcomes the biasing means and allows grasping of a food item between the first and second jaws 14, 28. The above examples are only illustrative of the various alternative handle means which could be used in combination with the novel first and second jaws 14, 28 of the present invention and should not be construed as limiting the application of the present invention.

Returning now to FIG. 1, as depicted therein, the cooking tong apparatus 10 is shown handling a food item 52 upon the grill 22. In use, the cooking tong apparatus 10 is manipulated by an operator who grasps the first and second handles 16, 38 with fingers through the finger receiving apertures 42, 44.

The operator holds the cooking tong apparatus 10 so that the operator's palm faces downwardly, that is, towards the plane of the upper surface of the grill 22. This orientation allows optimum comfort for the operator's wrist.

As the operator fingers are opened horizontally, the first and second handles 16, 38 move away from each other, pivoting the first and third tong elements 12, 32 in a horizontal plane about the second pivotal attachment member 34. The actuating bar 36 slides outwardly through the bar engaging bore 30 of the second tong element 24, causing the second tong element 24 to pivot in a vertical plane with respect to the first tong element 12. The flanged portion 40 of the actuating bar 36 prevents the actuating bar 36 from disengaging from the bar engaging bore 30. The pivoting of the second tong element 24 about the first pivotal attachment member 26 causes the first and second jaws 14, 28 to open in a vertical direction.

The lower jaw of the cooking tong apparatus, e.g. the first jaw 14, is inserted under the food item 52. The spacing of the tines 18 of the first and second jaws 14, 28 allows the tines 18 to fit between cross-members 20 of the grill 22, thus, permitting the first jaw 14 to slide underneath the food item 52 without disturbing it.

Once the first jaw 14 is underneath the food item 52, the operator closes the fingers to move the first and second handles 16, 38 toward each other, thereby pivoting the first and third tong elements 12, 32 in a horizontal plane about the second pivotal attachment member 34. The actuating bar 36 slides inwardly through the bar engaging bore 30, causing the second tong element 24 to pivot in a vertical plane with respect to the first tong element 12. The pivoting of the second tong element 24 about the first pivotal attachment member 26 causes the first and second jaws 14, 28 to close in a vertical direction, permitting the operator to grasp the food item 52 between the first and second jaws 14, 28.

With the food item 52 held within the grasp of the first and second jaws 14, 28, the operator can remove the food item 52 from the surface of the grill and view either side of the food item 52 to determine its doneness. The food item 52 can then be placed back on the grill to continue cooking on the same side as was previously cooking, turned over to cook on the other side, or transferred to a platter when cooking is complete.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved cooking tong apparatus for use with a grill comprising:

a first tong element having a first end and a second end;

a first jaw attached to the first tong element at the first end thereof, the first jaw having a plurality of spaced apart tines;

a first handle attached to the first tong element at the second end thereof;

a second tong element pivotally attached to the first tong element at a first pivot point, the second tong element having first and second ends, the second end of the second tong element having a bar engaging bore therein;

a first pivotal attachment means for pivotally attaching the first and second tong elements at the first pivot point;

a second jaw attached to the second tong element at the first end thereof, the second jaw having a plurality of spaced apart tines, wherein the first and second jaws are disposed in opposing gripping engagement to each other so that the first and second jaws open and close as the first and second tong elements are pivoted about the first pivot point;

a third tong element pivotally attached to the first tong element at a second pivot point disposed between the first handle and the first pivot point, the third tong element having a first end and a second end;

an actuating bar attached to the first end of the third tong element, the actuating bar slidably engaging the bar engaging bore in the second tong element and disposed therethrough;

a second pivotal attachment means for attaching the first and third tong elements at the second pivot point; and a second handle attached to the third tong element at the second end thereof, wherein the second handle is disposed opposite the first handle and wherein the actuating bar attached to the third tong element slidably engages the bar engagement bore of the second tong element as the first and second handles are pivoted about the second pivot point such that the first and second jaws open and close.

2. The cooking tong apparatus of claim 1 wherein the grill is formed of cross-members, and wherein the tines of the first and second jaws are appropriately spaced and sized to fit between the grill cross-members.

3. The cooking tong apparatus of claim 2 wherein the first and second handles lie in a substantially horizontal plane.

4. The cooking tong apparatus of claim 3 wherein the first and second handles each further comprise a finger receiving aperture defined therein.

5. The cooking tong apparatus of claim 4 wherein the first and second tong elements pivot about the first pivot point in a substantially vertical plane, opening and closing the first and second jaws in a vertical direction.

6. The cooking tong apparatus of claim 5 wherein pivotal attachment means comprises rivets.

7. The cooking tong apparatus of claim 6 wherein the tines of the first and second jaws are inwardly curved and substantially parallel.

8. A cooking tong apparatus for use with a grill having spaced apart, parallel members forming a grilling surface, the apparatus comprising:

a first tong element;

a first jaw attached to one end of the first tong element and having a plurality of spaced apart tines forming a first food gripping surface;

a second tong element having a bar engaging bore extending therethrough proximal one end thereof;

a second jaw attached to the distal end of the second tong element and having a plurality of spaced apart tines forming a second food gripping surface;

first pivot means pivotally connecting the first and second tong elements at a first pivot point so that the first and second food gripping surfaces of the first and second jaws, respectively are disposed in opposing gripping engagement to each other, the first and second jaws opening and closing as the first and second tong elements pivot about the first pivot point;

a third tong element having an actuating bar portion at one end thereof;

second pivot means pivotally connecting the first and third tong elements at a second pivot point, the actuating bar portion slidably engaging and extending through the bar engaging bore in the second tong element; and handle means attached to the first and third tong elements for pivoting the first and third tong elements about the second pivot point so that the actuating bar portion of the third tong element slidably engages the bar engagement bore of the second tong element as the first and second tong elements are pivoted about the second pivot point to effect selected opening and closing of the first and second jaws.

9. The cooking tong apparatus of claim 8 wherein the distances between the spaced apart tines of the first and second jaws are determined so that the tines fit between the grill members.

10. The cooking tong apparatus of claim 9 wherein the handle means comprises first and second handles connected to the first and third tong elements, respectively, and wherein the first and second handles are disposed substantially in a horizontal plane when the tines of the first and second jaws are disposed between or near the grill member so that the first and second jaws open and close by movement of same vertically.

* * * * *